(12) United States Patent
Nakatani et al.

(10) Patent No.: US 8,418,446 B2
(45) Date of Patent: Apr. 16, 2013

(54) EXHAUST GAS PURIFICATION SYSTEM FOR INTERNAL COMBUSTION ENGINE

(75) Inventors: Koichiro Nakatani, Mishima (JP);
Terutoshi Tomoda, Mishima (JP);
Shinobu Ishiyama, Numazu (JP);
Tomoyuki Ono, Sunto-gun (JP);
Tomoyuki Kogo, Gotenba (JP);
Katsuhiro Ito, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 175 days.

(21) Appl. No.: 12/740,250

(22) PCT Filed: Nov. 11, 2008

(86) PCT No.: PCT/JP2008/070503
§ 371 (c)(1),
(2), (4) Date: Apr. 28, 2010

(87) PCT Pub. No.: WO2009/063864
PCT Pub. Date: May 22, 2009

(65) Prior Publication Data
US 2010/0229536 A1     Sep. 16, 2010

(30) Foreign Application Priority Data

Nov. 13, 2007   (JP) .................... 2007-294706

(51) Int. Cl.
*F01N 3/24*     (2006.01)
*F01N 3/08*     (2006.01)
*F01N 3/20*     (2006.01)
*B01D 53/94*    (2006.01)
*F02D 41/04*    (2006.01)

(52) U.S. Cl.
USPC .................... 60/301; 60/278; 60/286; 60/295

(58) Field of Classification Search .................... 60/278, 60/286, 295, 301
See application file for complete search history.

(56) References Cited

U.S. PATENT DOCUMENTS 5,890,360 A     4/1999   Sasaki et al.
6,055,968 A *   5/2000   Sasaki et al. ............. 123/568.21
(Continued)

FOREIGN PATENT DOCUMENTS

JP    A-11-153049      6/1999
JP    A-2000-130154    5/2000
(Continued)

OTHER PUBLICATIONS

Nov. 8, 2011 Chinese Office Action issued in Chinese Patent Application No. 200880113562.X (with translation).

(Continued)

*Primary Examiner* — Kenneth Bomberg
*Assistant Examiner* — Dapinder Singh
(74) *Attorney, Agent, or Firm* — Oliff & Berridge, PLC

(57) ABSTRACT

Disclosed is a technology that enables better reduction of NOx stored in an NOx catalyst in an exhaust gas purification system for an internal combustion engine. When NOx stored in an NOx catalyst is to be reduced, the air-fuel ratio of the ambient atmosphere around the NOx catalyst is decreased to a target air-fuel ratio by decreasing the air-fuel ratio of the exhaust gas discharged from the internal combustion engine. In doing so, if the temperature of the NOx catalyst is not lower than a specific temperature, the air-fuel ratio of the ambient atmosphere around the NOx catalyst is decreased to the target air-fuel ratio while bringing the combustion state into low temperature combustion. On the other hand, if the temperature of the NOx catalyst is lower than the specific temperature, the air-fuel ratio of the ambient atmosphere around the NOx catalyst is decreased to the target air-fuel ratio while decreasing the quantity of EGR gas in a cylinder so that the amount of generated smoke is kept within an allowable range.

4 Claims, 3 Drawing Sheets

U.S. PATENT DOCUMENTS

| | | | | |
|---|---|---|---|---|
| 6,101,999 | A * | 8/2000 | Ohashi et al. | 123/295 |
| 6,129,075 | A * | 10/2000 | Murata et al. | 123/568.21 |
| 6,152,118 | A * | 11/2000 | Sasaki et al. | 123/568.21 |
| 6,209,515 | B1 * | 4/2001 | Gotoh et al. | 123/305 |
| 6,240,721 | B1 | 6/2001 | Ito et al. | |
| 6,338,245 | B1 * | 1/2002 | Shimoda et al. | 60/285 |
| 6,782,696 | B2 * | 8/2004 | Shigahara et al. | 60/285 |
| 7,267,117 | B2 * | 9/2007 | Tonetti et al. | 123/704 |
| 7,493,762 | B2 * | 2/2009 | Barbe et al. | 60/605.2 |
| 2006/0254259 | A1 | 11/2006 | Kurtz et al. | |
| 2007/0246028 | A1 * | 10/2007 | Fujita et al. | 123/568.12 |
| 2008/0022677 | A1 * | 1/2008 | Barbe et al. | 60/599 |
| 2009/0132153 | A1 * | 5/2009 | Shutty et al. | 701/108 |

FOREIGN PATENT DOCUMENTS

| | | |
|---|---|---|
| JP | A-2000-145547 | 5/2000 |
| JP | A-2003-201890 | 7/2003 |
| JP | A-2004-245046 | 9/2004 |
| JP | A-2004-360484 | 12/2004 |

OTHER PUBLICATIONS

International Search Report mailed on Feb. 17, 2009 in corresponding International Application No. PCT/JP2008/070503.

* cited by examiner

EXHAUST GAS PURIFICATION SYSTEM FOR INTERNAL COMBUSTION ENGINE

This application is the national phase application under 35 U.S.C §371 of PCT international application No. PCT/JP2008/070503 filed on 11 Nov. 2007, which claims priority of Japanese patent application No. 2007-294706 filed on 13 Nov. 2007, the contents of which are incorporates herein by reference.

TECHNICAL FIELD

The present invention relates to an exhaust gas purification system for an internal combustion engine equipped with an NOx storage reduction catalyst provided in an exhaust passage of an internal combustion engine.

BACKGROUND ART

In the case where an NOx storage reduction catalyst (which will be simply referred to as the NOx catalyst hereinafter) is provided in an exhaust passage of an internal combustion engine, NOx stored in the NOx catalyst may be reduced by decreasing the air-fuel ratio of the ambient atmosphere around the NOx catalyst to a target air-fuel ratio. A known way of decreasing the air-fuel ratio of the ambient atmosphere around the NOx catalyst is decreasing the air-fuel ratio of the exhaust gas discharged from the internal combustion engine.

Specific methods of decreasing the air-fuel ratio of the exhaust gas discharged from the internal combustion engine include decreasing the intake air quantity, increasing the quantity of EGR gas, performing sub fuel injection in the internal combustion engine at such a time posterior to the main fuel injection that the supplied fuel is burned, and retarding the timing of fuel injection in the internal combustion engine.

Patent document 1 discloses a technology in which when NOx stored in the NOx catalyst is to be reduced, lean operation is changed into rich operation, and a large quantity of EGR gas is supplied into the cylinder.

Patent document 2 discloses a technology in which when NOx stored in the NOx catalyst is to be reduced at a time when the engine speed and engine load are high, the quantity of fresh air is decreased by increasing the quantity of EGR gas, whereby the quantity of gas passing through the NOx catalyst is decreased.

[Patent Document 1] Japanese Patent Application Laid-Open No. 2004-360484

[Patent Document 2] Japanese Patent Application Laid-Open No. 2004-245046

DISCLOSURE OF THE INVENTION

Problem to be Solved by the Invention

In some cases, when NOx stored in the NOx catalyst is to be reduced, the combustion state of an internal combustion engine is brought into low temperature combustion, thereby decreasing the air-fuel ratio of the exhaust gas discharged from the internal combustion engine. Here, the "low temperature combustion" refers to a combustion state in which the quantity of EGR gas in the cylinder is made larger than the quantity that maximizes the generation of smoke to thereby reduce the amount of generated smoke.

By increasing the quantity of EGR gas in the cylinder, the air-fuel ratio of the exhaust gas discharged from the internal combustion engine can be decreased while preventing the fuel economy from becoming worse. Consequently, in the above-described case, it is possible to reduce NOx stored in the NOx catalyst while reducing the generation of smoke and preventing the fuel economy from becoming worse.

However, when the combustion state of the internal combustion engine is brought into low temperature combustion, the temperature of the exhaust gas discharged from the internal combustion engine will decrease. Due to this effect, if the temperature of the NOx catalyst becomes excessively low, the ratio of the quantity of reduced NOx to the quantity of NOx stored in the NOx catalyst (which will be hereinafter referred to as the NOx reduction ratio) may become unduly low.

The present invention has been made in view of the above-described problem and its object is to provide a technology that enables better reduction of NOx stored in an NOx catalyst in an exhaust gas purification system for an internal combustion engine.

Means for Solving the Problem

According to the present invention, when NOx stored in an NOx catalyst is to be reduced, the air-fuel ratio of the ambient atmosphere around the NOx catalyst is decreased to a target air-fuel ratio by decreasing the air-fuel ratio of the exhaust gas discharged from the internal combustion engine. In doing so, if the temperature of the NOx catalyst is not lower than a specific temperature, the air-fuel ratio of the ambient atmosphere around the NOx catalyst is decreased to the target air-fuel ratio while achieving low temperature combustion in the internal combustion engine. On the other hand, if the temperature of the NOx catalyst is lower than the specific temperature, the air-fuel ratio of the ambient atmosphere around the NOx catalyst is decreased to the target air-fuel ratio while decreasing the quantity of EGR gas in a cylinder(s) so that the amount of generated smoke is kept within an allowable range.

More specifically, an exhaust gas purification system for an internal combustion engine according to the present invention is characterized by comprising:

an NOx storage reduction catalyst provided in an exhaust passage of an internal combustion engine;

EGR unit for introducing a portion of exhaust gas flowing in an exhaust system of the internal combustion engine into an intake system of the internal combustion engine as EGR gas;

NOx reduction unit for decreasing the air-fuel ratio of ambient atmosphere around said NOx storage reduction catalyst to a target air-fuel ratio by decreasing the air-fuel ratio of exhaust gas discharged from the internal combustion engine, thereby reducing Nox stored in said NOx storage reduction catalyst, wherein when NOx stored in said NOx storage reduction catalyst is to be reduced, if the temperature of said NOx storage reduction catalyst is equal to or higher than a specific temperature, said NOx reduction unit decreases the air-fuel ratio of ambient atmosphere around said NOx storage reduction catalyst to said target air-fuel ratio while making the quantity of the EGR gas in a cylinder larger than a quantity that maximizes the amount of generated smoke, and if the temperature of said NOx storage reduction catalyst is lower than said specific temperature, said NOx reduction unit decreases the air-fuel ratio of ambient atmosphere around said NOx storage reduction catalyst to said target air-fuel ratio while decreasing the quantity of the EGR gas in the cylinder so that the amount of generated smoke is kept within an allowable range.

In the system according to the present invention, the quantity of the EGR gas in the cylinder of the internal combustion engine may be controlled by regulating the quantity of the EGR gas introduced into the intake system of the internal combustion engine using the EGR unit.

The specific temperature mentioned here may be a threshold value at which it can be concluded that even if the temperature of the exhaust gas decreases due to low temperature combustion achieved in the internal combustion engine, the temperature of the NOx catalyst will not become so low that the NOx reduction ratio becomes unduly low.

Thus, according to the present invention, if the temperature of the NOx catalyst is sufficiently high at the time when NOx stored in the NOx catalyst is to be reduced, the combustion state of the internal combustion engine is brought into low temperature combustion. With this feature, the air-fuel ratio of the exhaust gas discharged from the internal combustion engine can be decreased while reducing the amount of generated smoke and preventing the fuel economy from becoming worse.

On the other hand, in the case where there is a possibility that the temperature of the NOx catalyst will become excessively low if the combustion state of the internal combustion engine is brought into low temperature combustion at the time when NOx stored in the NOx catalyst is to be reduced, the quantity of the EGR gas in the cylinder is decreased without bringing the combustion state of the internal combustion engine into low temperature combustion. In addition, the air-fuel ratio of the exhaust gas discharged from the internal combustion engine is decreased by a method other than increasing the quantity of the EGR gas. In this case also, the air-fuel ratio of the exhaust gas can be decreased while reducing the amount of generated smoke, as with the above-described case. Furthermore, since a decrease in the temperature of the NOx catalyst can be prevented, a decrease in the NOx reduction ratio can be prevented.

As described above, by changing the method of decreasing the air-fuel ratio of the exhaust gas discharged from the internal combustion engine based on the temperature of the NOx catalyst at the time when NOx stored in the NOx catalyst is to be reduced, better reduction of NOx stored in the NOx catalyst can be achieved.

Advantageous Effect of the Invention

According to the present invention, better reduction of NOx stored in an NOx catalyst can be achieved in an exhaust gas purification system for an internal combustion engine.

DESCRIPTION OF THE REFERENCE SIGNS

Figure 1:
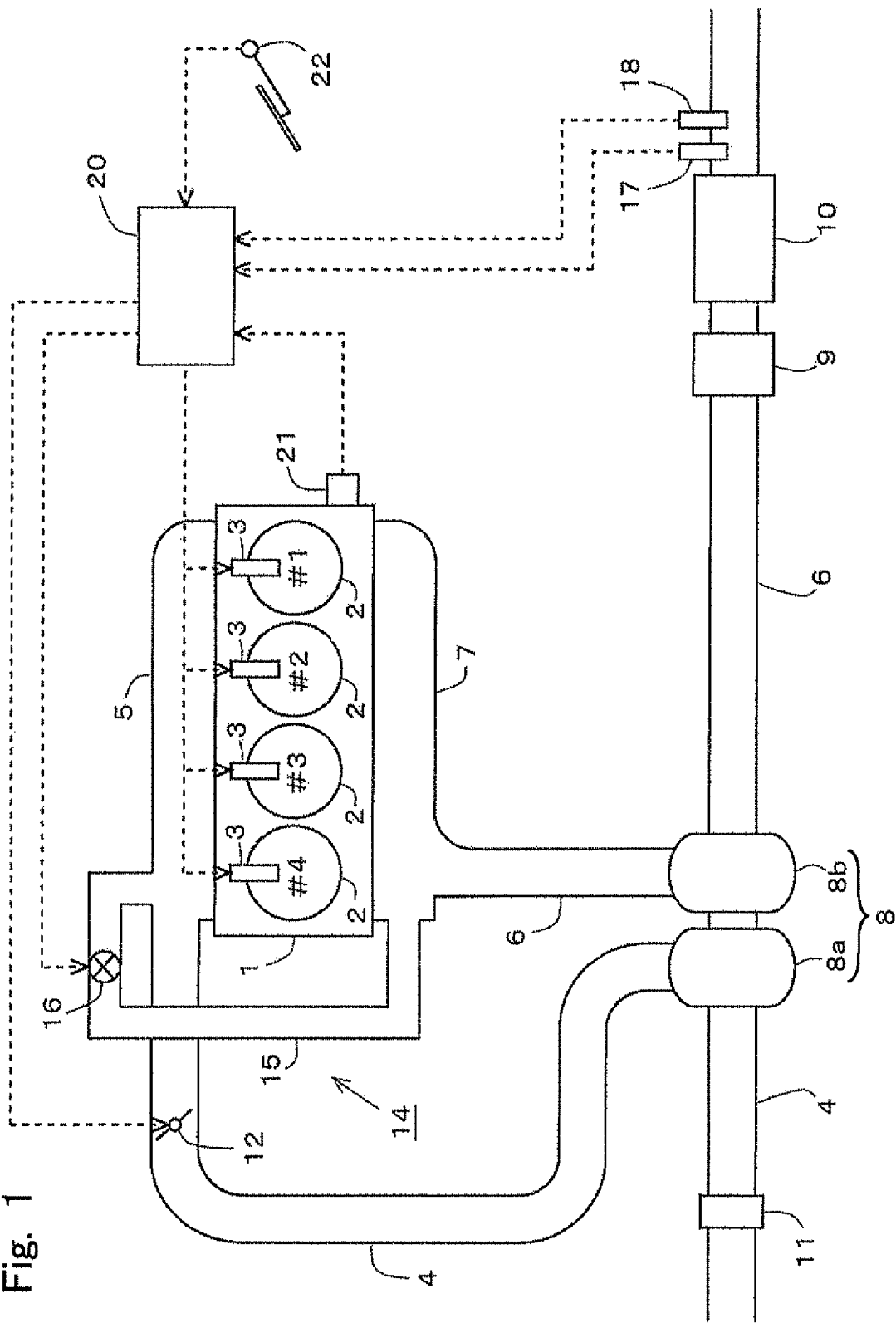
FIG. 1 is a diagram showing the general configuration of an internal combustion engine according to embodiment 1 and its air-intake and exhaust system.

1: internal combustion engine
2: cylinder
3: fuel injection valve
4: intake passage
5: intake manifold
6: exhaust passage
7: exhaust manifold
8: turbocharger
8a: compressor housing
8b: turbine housing
9: oxidation catalyst
10: NOx storage reduction catalyst
11: air flow meter
12: throttle valve
13: fuel addition valve
14: EGR apparatus
15: EGR passage
16: EGR valve
17: air-fuel ratio sensor
18: temperature sensor
20: ECU
21: crank position sensor
22: accelerator opening degree sensor

THE BEST MODE FOR CARRYING OUT THE INVENTION

In the following, a specific embodiment of the exhaust gas purification system for an internal combustion engine according to the present invention will be described with reference to the drawings.
(Embodiment 1)
<General Configuration of Internal Combustion Engine and Air-Intake and Exhaust System Thereof>.

FIG. 1 is a diagram showing the general configuration of an internal combustion engine according to this embodiment and its air-intake and exhaust system. The internal combustion engine 1 is a diesel engine having four cylinders 2 for driving a vehicle. Each cylinder 2 is equipped with a fuel injection valve 3 that injects fuel directly into the cylinder 2.

The internal combustion engine 1 is connected with an intake manifold 5 and an exhaust manifold 7. One end of an intake passage 4 is connected to the intake manifold 5. One end of an exhaust passage 6 is connected to the exhaust manifold 7.

A compressor housing 8a of a turbocharger 8 is provided in the intake passage 4. A turbine housing 8b of the turbocharger 8 is provided in the exhaust passage 6.

An air flow meter 11 is provided in the intake passage 4 upstream of the compressor housing 8a. A throttle valve 12 is provided in the intake passage 4 downstream of the compressor housing 8a.

An oxidation catalyst 9 is provided in the exhaust passage 6 downstream of the turbine housing 8b. An NOx catalyst 10 is provided in the exhaust passage 6 downstream of the oxidation catalyst 9.

An air-fuel ratio sensor 17 that senses the air-fuel ratio of the exhaust gas and a temperature sensor 18 that senses the temperature of the exhaust gas are provided in the exhaust passage 6 downstream of the NOx catalyst 10.

The internal combustion engine 1 according to the embodiment is equipped with an EGR apparatus 14 that introduces a portion of the exhaust gas into the intake system as EGR gas. The EGR apparatus 14 includes an EGR passage 15 and an EGR valve 16. One end of the EGR passage 15 is connected to the exhaust manifold 7 and the other end thereof is connected to the intake manifold 5. The EGR gas is introduced from the exhaust manifold 7 into the intake manifold 5 through the EGR passage 15. The EGR valve 16 is provided in the EGR passage 15, and the quantity of EGR gas introduced into the intake manifold 5 is regulated by the EGR valve 16. The quantity of the EGR gas in each cylinder 2 can be controlled by regulating the quantity of EGR gas introduced into the intake manifold 5. In this embodiment, the EGR apparatus 14 corresponds to the EGR unit according to the present invention.

An electronic control unit (ECU) 20 is annexed to the internal combustion engine 1. The ECU 20 is a unit that controls the operation state of the internal combustion engine 1 etc. The ECU 20 is electrically connected with the air flow meter 11, the air-fuel ratio sensor 17, the temperature sensor 18, a crank position sensor 21, and an accelerator opening degree sensor 22. The crank position sensor 21 senses the crank angle of the internal combustion engine 1. The accelerator opening degree sensor 22 senses the opening degree of the accelerator of the vehicle on which the internal combustion engine 1 is mounted. Output signals of the sensors are input to the ECU 20.

The ECU 20 computes the engine speed of the internal combustion engine 1 based on the measurement value of the crank position sensor 21. The ECU 20 also computes the engine load of the internal combustion engine 1 based on the measurement value of the accelerator opening degree sensor 22. The ECU 20 also computes the temperature of the NOx catalyst 10 based on the measurement value of the temperature senor 18. The ECU 20 also computes the air-fuel ratio of the exhaust gas flowing into the NOx catalyst 10, i.e. the air-fuel ratio of the ambient atmosphere around the NOx catalyst 10 based on the measurement value of the air-fuel ratio sensor 17.

The ECU 20 is also electrically connected with the fuel injection valves 3, the throttle valve 12, and the EGR valve 16. These valves are controlled by the ECU 20.

<NOx Reduction Control>

In this embodiment, an NOx reduction control by which NOx stored in the NOx catalyst 10 is reduced is performed. In order to reduce NOx stored in the NOx catalyst 10, it is necessary to decrease the air-fuel ratio of the ambient atmosphere around the NOx catalyst 10 to a target air-fuel ratio at which the reduction of NOx is possible. The NOx reduction control according to this embodiment is performed by a rich spike control in which the air-fuel ratio of the ambient atmosphere around the NOx catalyst 10 is decreased to the target NOx reduction air-fuel ratio repeatedly at relatively short intervals.

In this embodiment, the air-fuel ratio of the ambient atmosphere around the NOx catalyst 10 is decreased by decreasing the air-fuel ratio of the exhaust gas discharged from the internal combustion engine 1. (Hereinafter, the operation of decreasing the air-fuel ratio of the exhaust gas discharged from the internal combustion engine 1 will be referred to as "combustion rich".)

Specific combustion rich methods may include, for example, decreasing the intake air quantity by the throttle valve 12, increasing the quantity of the EGR gas in the cylinder 2 by the EGR valve 16, performing sub fuel injection by the fuel injection valve 3 at such a time posterior to the main fuel injection that the supplied fuel is burned, and retarding the timing of fuel injection by the fuel injection valve 3.

In the internal combustion engine 1 according to the embodiment, normal combustion and low temperature combustion can be selectively achieved as the combustion state. To achieve the low temperature combustion as the combustion state of the internal combustion engine 1, the quantity of the EGR gas introduced into the intake manifold 5 is increased, thereby making the quantity of the EGR gas in the cylinder 2 larger than the quantity that maximizes the generation of smoke. On the other hand, to achieve normal combustion as the combustion state of the internal combustion engine 1, the quantity of the EGR gas in the cylinder 2 is decreased to thereby reduce the generation of smoke, whereby the amount of generated smoke can be kept within an allowable range.

As described above, when the combustion state of the internal combustion engine 1 is low temperature combustion, the quantity of the EGR gas in the cylinder 2 becomes large. In consequence, if low temperature combustion is achieved as the combustion state of the internal combustion engine 1 at the time when the combustion rich is performed in order to reduce NOx stored in the NOx catalyst 10, the air-fuel ratio of the exhaust gas discharged from the internal combustion engine 1 can be decreased while controlling the generation of smoke. In addition, it is possible to decrease the air-fuel ratio of the ambient atmosphere around the NOx catalyst 10 to the target air-fuel ratio while reducing the deterioration of fuel economy as compared to that in the case where the combustion rich is performed while decreasing the quantity of the EGR gas in the cylinder 2.

However, in the case where the combustion state of the internal combustion engine 1 is low temperature combustion, the temperature of the exhaust gas discharged from the internal combustion engine 1 is lower than that in the case where the combustion state of the internal combustion engine 1 is normal combustion. If the temperature of the NOx catalyst becomes excessively low due to this, the NOx reduction ratio may become unduly low.

Figure 2:
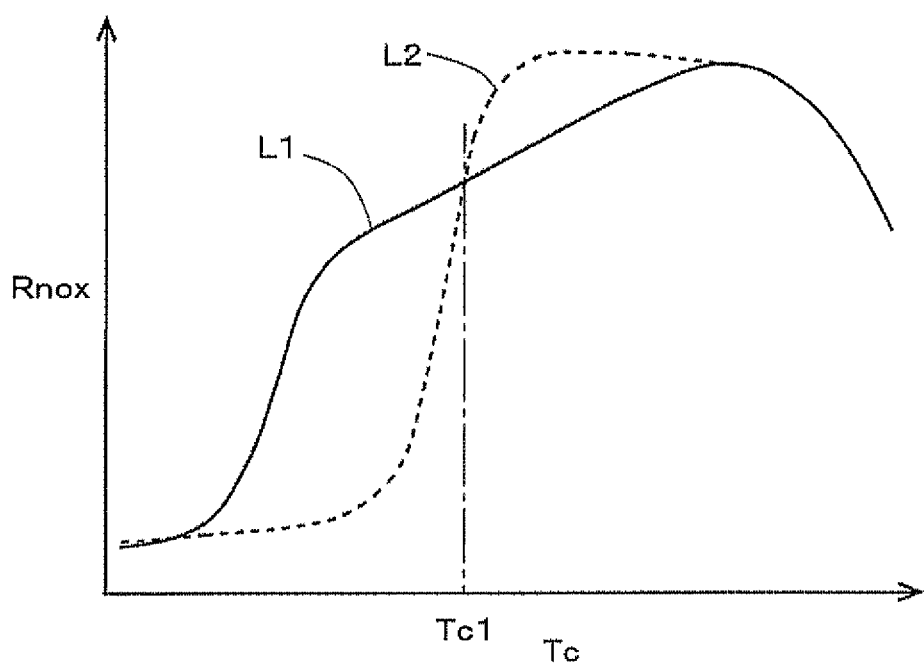
FIG. 2 is a graph showing the relation between the temperature of an NOx catalyst at the time when the NOx reduction control is to be executed and the NOx reduction ratio achieved by executing NOx reduction control.

The relation between the temperature of the NOx catalyst 10 at a time when the NOx reduction control is to be executed (i.e. at a time before the combustion rich is performed) and the NOx reduction ratio achieved by executing the NOx reduction control will be described with reference to FIG. 2. In FIG. 2, the vertical axis represents the NOx reduction ratio Rnox, and the horizontal axis represents the temperature Tc of the NOx catalyst. The solid curve L1 is for the case in which the combustion rich is performed while the combustion state of the internal combustion engine 1 is normal combustion, and the broken curve L2 is for the case in which the combustion rich is performed while the combustion state of the internal combustion engine 1 is low temperature combustion.

In the case where the combustion rich is performed while the combustion state of the internal combustion engine 1 is normal combustion, the air-fuel ratio of the exhaust gas discharged from the internal combustion engine 1 is decreased by a method other than increasing the quantity of the EGR gas in the cylinder 2. Furthermore, in the case where the combustion rich is performed while the combustion state of the internal combustion engine 1 is normal combustion, introduction of the EGR gas into the intake manifold 5 is suspended by closing the EGR valve 16. Thus, supply of EGR gas into the cylinders 2 is stopped, and consequently generation of smoke during the execution of the combustion rich can be reduced.

In the case where the combustion rich is performed while the combustion state of the internal combustion engine 1 is low temperature combustion, the air-fuel ratio of the exhaust gas discharged from the internal combustion engine 1 is further decreased using a method other than increasing the quantity of the EGR gas in the cylinder 2 while performing low temperature combustion, thereby reducing the air-fuel ratio of the ambient atmosphere around the NOx catalyst 10 to the target air-fuel ratio.

As shown in FIG. 2, when the temperature Tc of the NOx catalyst 10 at the time when the NOx reduction control is performed is not lower than a specific temperature Tc1, the NOx reduction ratio Rnox is higher in the case where the combustion rich is performed while the combustion state of the internal combustion engine 1 is low temperature combustion than in the case where the combustion rich is performed while the combustion state of the internal combustion engine 1 is normal combustion.

On the other hand, when the temperature Tc of the NOx catalyst 10 at the time when the NOx reduction control is performed is lower than a specific temperature Tc1, the NOx reduction ratio Rnox is higher in the case where the combustion rich is performed while the combustion state of the internal combustion engine 1 is normal combustion than in the case where the combustion rich is performed while the combustion state of the internal combustion engine 1 is low temperature combustion.

In the case where the combustion rich is performed while the combustion state of the internal combustion engine 1 is normal combustion, supply of the EGR gas into the cylinders 2 is suspended, as described above. This makes the temperature of the exhaust gas higher than that in the case where the combustion state of the internal combustion engine 1 is low temperature combustion. Consequently the temperature of the NOx catalyst 10 can be prevented from becoming low. Therefore, when the temperature To of the NOx catalyst 10 at the time when the NOx reduction control is performed is lower than a specific temperature Tc1, the NOx reduction ratio Rnox becomes higher than that in the case where the combustion rich is performed while the combustion state of the internal combustion engine 1 is low temperature combustion.

In view of the above, in this embodiment, if the temperature Tc of the NOx catalyst 10 at the time when the NOx reduction control is performed is equal to or higher than the specific temperature Tc1, the combustion rich is performed while achieving low temperature combustion as the combustion state of the internal combustion engine 1. On the other hand, if the temperature Tc of the NOx catalyst 10 at the time when the NOx reduction control is performed is lower than the specific temperature Tc1, the combustion rich is performed while achieving normal combustion as the combustion state of the internal combustion engine 1.

The specific temperature Tc1 mentioned here is a threshold value at which it can be concluded that even if the temperature of the exhaust gas decreases due to low temperature combustion achieved in the internal combustion engine 1, the temperature of the NOx catalyst 10 will not become so low that the NOx reduction ratio becomes unduly low. In other words, it is a threshold value at which it can be concluded that the NOx reduction ratio Rnox will be higher in the case where the combustion rich is performed while the combustion state of the internal combustion engine 1 is low temperature combustion than in the case where the combustion rich is performed while the combustion state of the internal combustion engine 1 is normal combustion. The specific temperature Tc1 as such can be determined in advance based on, for example, experiments.

Figure 3:
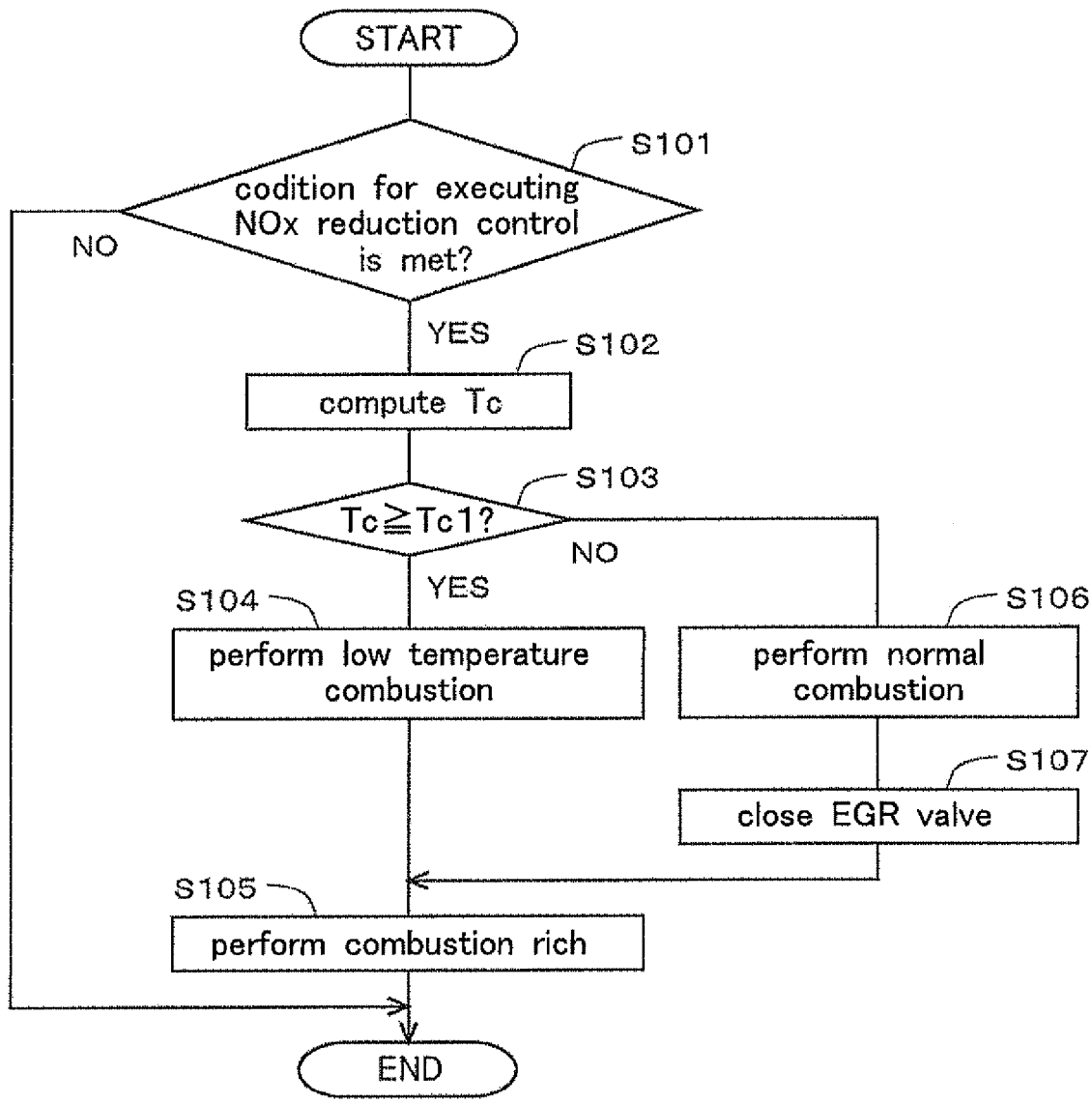
FIG. 3 is a flow chart showing a routine of the NOx reduction control according to embodiment 1.

In the following, a routine of the NOx reduction control according to the embodiment will be described with reference to the flow chart shown in FIG. 3. This routine is stored in the ECU 20 in advance and executed repeatedly at predetermined intervals while the internal combustion engine 1 is operating. In this embodiment, the ECU 20 that executes this routine corresponds to the NOx reduction unit according to the present invention.

In this routine, first in step S101, the ECU 20 determines whether or not a condition for executing the NOx reduction control is met. Examples of the condition for executing the NOx reduction control include that the elapsed time since the last execution of the NOx reduction control reaches a predetermined time or that the integrated amount of injected fuel in the internal combustion engine 1 since the last execution of the NOx reduction control reaches a predetermined amount. If the determination in step S101 is affirmative, the ECU 20 proceeds to step S102, and if the determination is negative, the ECU 20 once terminates execution of this routine.

Then, the ECU 20 proceeds to step S102, where it computes the temperature Tc of the NOx catalyst 10.

Then, the ECU 20 proceeds to step S103, where it determines whether or not the temperature Tc of the NOx catalyst 10 is equal to or higher than the specific temperature Tc1. If the determination in step S103 is affirmative, the ECU 20 proceeds to step S104, and if the determination is negative, the ECU 20 proceeds to step S106.

In step S104, the ECU 20 brings the combustion state of the internal combustion engine 1 into low temperature combustion. Thereafter, the ECU 20 proceeds to step S105.

On the other hand, in step S106, the ECU 20 brings the combustion state of the internal combustion engine 1 into normal combustion.

Then, the ECU 20 proceeds to step S107, where it closes the EGR valve 16 to stop supply of the EGR gas into the cylinders 2. Thereafter, the ECU 20 proceeds to step S105.

In step S105, the ECU 20 executes the combustion rich. That is, the ECU 20 decreases the air-fuel ratio of the internal combustion engine 1 by executing a process other than increasing the quantity of EGR gas to thereby reduce the air-fuel ratio of the ambient atmosphere around the NOx catalyst 10 to the target air-fuel ratio. Thereafter, the ECU 20 once terminates execution of this routine.

In the above-described routine, if the temperature Tc of the NOx catalyst 10 at the time when the NOx reduction control is to be executed is equal to or higher than the specific temperature Tc1, the combustion rich is performed while the combustion state of the internal combustion engine 1 is brought into low temperature combustion. On the other hand, if the temperature Tc of the NOx catalyst 10 at the time when the NOx reduction control is to be executed is lower than the specific temperature Tc1, the combustion rich is performed while the combustion state of the internal combustion engine 1 is brought into normal combustion and supply of the EGR gas into the cylinders 2 is suspended. Therefore, in both cases, the air-fuel ratio of the ambient atmosphere around the NOx catalyst 10 can be decreased to the target air-fuel ratio while controlling the generation of smoke.

Furthermore, if the temperature Tc of the NOx catalyst 10 at the time when the NOx reduction control is to be executed is equal to or higher than the specific temperature Tc1, the combustion rich is performed while increasing the quantity of the EGR gas in the cylinders 2 as much as possible, and therefore the fuel economy can be prevented from being made worse by the combustion rich. On the other hand, if the temperature Tc of the NOx catalyst 10 at the time when the NOx reduction control is to be executed is lower than the specific temperature Tc1, the combustion rich can be performed while preventing a decrease in the NOx reduction ratio, and therefore NOx can be reduced with higher efficiency.

As per the above, with the NOx reduction control according to the embodiment, better reduction of NOx stored in the NOx catalyst 10 can be achieved.

In the embodiment, if the temperature Tc of the NOx catalyst 10 at the time when the NOx reduction control is to be executed is equal to or higher than the specific temperature Tc1, the combustion rich is performed while the combustion state of the internal combustion engine 1 is brought into normal combustion and supply of the EGR gas into the cylinders is suspended. However, in such cases, supply of the EGR gas into the cylinders 2 need not necessarily be suspended. Thus, the combustion rich may be performed while bringing the combustion state of the internal combustion engine 1 into normal combustion and making the quantity of the EGR gas supplied into the cylinders 2 smaller than that in the case where the combustion rich is not performed. In this case, the quantity of the EGR gas supplied into the cylinders 2 is decreased to such an extent that the amount of smoke generated while the combustion rich is performed will be kept within an allowable range.

The invention claimed is:

1. An exhaust gas purification system for an internal combustion engine comprising:
    an exhaust passage;
    a NOx storage reduction catalyst provided in the exhaust passage of the internal combustion engine; and
    an electronic control unit (ECU) that includes control logic, so that when the NOx storage reduction catalyst is active and NOx stored in the NOx storage reduction catalyst is to be reduced, the ECU;
        instructs the internal combustion engine to perform a normal combustion if a temperature of the NOx storage reduction catalyst is below a specific temperature;
        instructs the internal combustion engine to perform a low temperature combustion if the temperature of the NOx storage reduction catalyst is equal to or higher than the specific temperature; and
        decrease an air-fuel ratio of ambient atmosphere around the NOx storage reduction catalyst to a target air-fuel ratio by decreasing the air-fuel ratio of exhaust gas discharged from the internal combustion engine, thereby reducing the NOx stored in the NOx storage reduction catalyst.

2. The exhaust gas purification system for the internal combustion engine according to claim 1, further comprising:
    an EGR unit configured to introduce a portion of exhaust gas flowing in an exhaust system of the internal combustion engine into an intake system of the internal combustion engine as EGR gas, wherein
    when the ECU instructs the internal combustion engine to perform the normal combustion, the ECU also instructs the EGR unit to suspend introduction of the EGR gas into the intake system of the internal combustion engine by closing an EGR valve of the EGR unit.

3. An electronic control unit (ECU) configured to control an internal combustion engine having an exhaust gas purification system that includes a NOx storage reduction catalyst provided in an exhaust passage of the internal combustion engine, the ECU including control logic configured to control the internal combustion engine, so that when the NOx storage reduction catalyst is active and NOx stored in the NOx storage reduction catalyst is to be reduced, the ECU instructs the internal combustion engine to:
    perform a normal combustion if a temperature of the NOx storage reduction catalyst is below a specific temperature;
    perform a low temperature combustion if the temperature of the NOx storage reduction catalyst is equal to or higher than the specific temperature; and
    decrease an air-fuel ratio of ambient atmosphere around the NOx storage reduction catalyst to a target air-fuel ratio by decreasing the air-fuel ratio of exhaust gas discharged from the internal combustion engine, thereby reducing the NOx stored in the NOx storage reduction catalyst.

4. The ECU according to claim 3, wherein:
    the exhaust gas purification system further includes an EGR unit configured to introduce a portion of exhaust gas flowing in an exhaust system of the internal combustion engine into an intake system of the internal combustion engine as EGR gas; and
    when the ECU instructs the internal combustion engine to perform the normal combustion, the ECU also instructs the EGR unit to suspend introduction of the EGR gas into the intake system of the internal combustion engine by closing an EGR valve of the EGR unit.

* * * * *